Dec. 28, 1954  H. R. GROSS  2,698,376
DIRIGIBLE LAMP MOUNTING
Filed Dec. 29, 1951
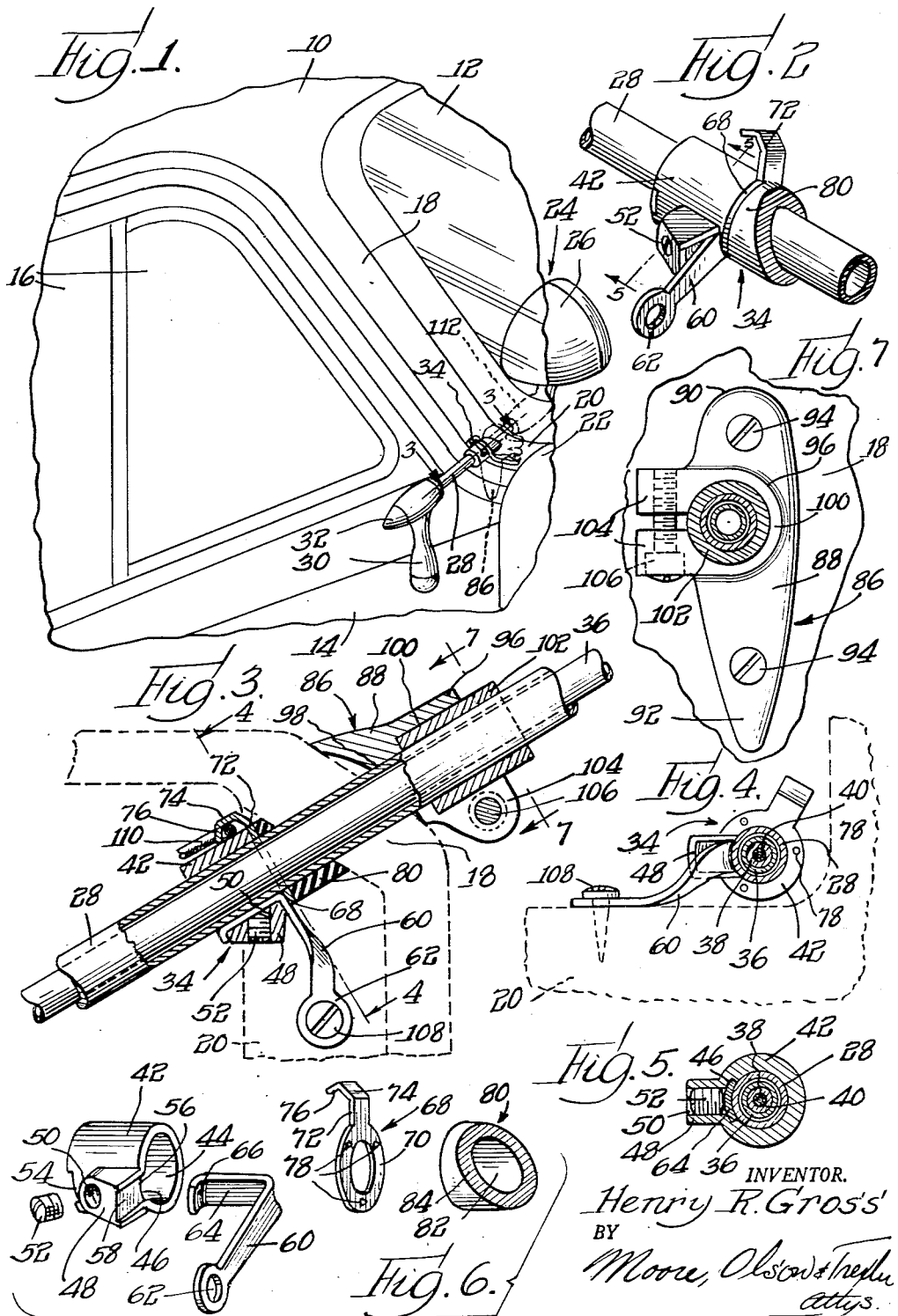
INVENTOR.
Henry R. Gross
BY
Moore, Olson & Trexler
attys.

United States Patent Office

2,698,376
Patented Dec. 28, 1954

2,698,376

DIRIGIBLE LAMP MOUNTING

Henry R. Gross, Chicago, Ill.

Application December 29, 1951, Serial No. 264,213

3 Claims. (Cl. 240—61.13)

This invention is concerned with a mounting bracket, more particularly an inside mounting bracket for a spot light having use in automobiles, trucks and the like, such a spot light being known as a dirigible spot light.

Dirigible spot lights such as shown in my prior Patent No. 2,540,257, Dirigible Spot Light, issued February 6, 1951, have a lamp unit mounted on the outside of the automobile or other vehicle and are controlled from inside the vehicle for substantially universal movement. Such spot lights generally are mounted on a front window post, usually on the left or driver's side. Practically every make of car and truck has a window or windshield post of different configuration and disposition, and great variations may be found in the same make from year to year. Heretofore this has necessitated a different mounting bracket for each make and year, or at least for all cars or the like of substantially similar models.

An object of this invention is to provide a universal mounting bracket for a dirigible spot light.

A further object of this invention is to provide a spot light mounting bracket of simple construction and readily installed.

Another object of this invention is to provide a universal mounting bracket for a dirigible spot light, which bracket readily is adapted to substantially any vehicle with no cutting or the like of any metal part of the bracket.

Yet another object of this invention is to provide a dirigible spot light bracket which can be installed with a minimum of fasteners.

Other and further objects and advantages of the present invention will be apparent from a perusal of the following description when taken in connection with the accompanying drawings wherein:

Fig. 1 is a perspective view of the left side of an automobile or the like adjacent the windshield and taken from the inside to show my mounting bracket in place;

Fig. 2 is an enlarged perspective view showing the mounting bracket per se;

Fig. 3 is a longitudinal sectional view taken from above and substantially along the lines 3—3 of Fig. 1;

Fig. 4 is a cross-sectional view taken along the line 4—4 of Fig. 3;

Fig. 5 is a cross-sectional view taken along the line 5—5 of Fig. 2;

Fig. 6 is an exploded perspective view of the inside mounting bracket; and

Fig. 7 is a cross-sectional view taken substantially along the line 7—7 of Fig. 3 and showing the outside mounting bracket used in conjunction with the inside mounting bracket.

Referring first to Fig. 1, there may be seen a portion of the inside of an automobile comprising a roof 10, a windshield 12, a door 14 having windows 16, and a window or windshield post 18 curving to a substantially horizontal portion adjacent the lower end at 20, the lower end terminating against the end of the dashboard 22. A dirigible spot light 24 including a spot lamp unit 26, a mounting sleeve 28, and a handle 30 preferably having a switch 32 at the rear end thereof is mounted on the windshield post 18 by a universal inside mounting bracket 34 with the mounting sleeve 28 extending through the post 18. The dirigible spot light 24 may be of conventional construction and includes in addition to the parts enumerated a control sleeve 36 (Figs. 3–5) and a control rod 38 (Figs. 4 and 5) suitably connected and geared to the handle 30 and the spot lamp unit 26 for substantially universal movement of the latter. An electrical conductor 40 extends through the center of the control rod 38 as is the usual practice.

The inside mounting bracket 34 as shown in Figs. 2–6 comprises a substantially cylindrical bracket body 42 having a central axial aperture 44 therethrough for receiving the mounting sleeve 28. The bracket body 42 is provided with an internal longitudinal slot or groove 46 and an angularly disposed boss 48 on the side of the bracket body 42 is provided with an aperture 50 communicating with the slot or groove 46. The aperture 50 is threaded for receipt of a set screw 52. The bracket body 42 is completed by a transverse relieved portion or groove 54 at one end thereof and by a similar relieved portion 56 at the other end blending into a groove or channel 58 along the front edge of the boss.

A substantially L-shaped bracket arm 60 is formed of sheet metal. The arm 60 progressively decreases in width toward its outer extremity which is formed with an eyelet 62. The foot 64 of the L-shaped arm 60 is arcuate in cross section and is provided at its end with an upturned tip 66. The foot 64 of the bracket arm 60 fits in the channel or groove 46 of the bracket body 42 as best may be seen in Fig. 5 and is clamped against the mounting sleeve 28 by the set screw 52. The longer portion of the arm 60 fits in the relieved portion 56 and channel 58 while the tip 66 fits in the relieved portion 54. The longer portion of the arm 60, it should be noted, is initially flat as shown in Figs. 2 and 6 and readily can be twisted to substantially any configuration by a pair of pliers for mounting as shown in Figs. 1, 3, and 4.

The inside mounting bracket 34 further includes a wire clip 68 made of sheet metal. The wire clip 68 includes a ring-like section 70 having an arm 72 extending substantially radially therefrom. The arm is bent over at 74 and again at 76 so as to form a wire holding finger. The wire clip 68 is completed by arcuately spaced protuberances 78, illustrated as three in number on the ring-like section 70. The inner diameter of the ring-like section 70 is such as to receive the mounting sleeve 28 with the arm 72 curving back over the bracket body 42.

The inside bracket is completed by a cylindrical spacer 80 of rubber or the like having a bore 82 with an inside diameter such as frictionally to grip a mounting sleeve 28. The spacer 80 is cut off at right angles to the axis of the spacer while the opposite end of the spacer is cut obliquely at 84.

The spot light 24 likewise is mounted by an outside bracket 86. The outside bracket 86 comprises a metal casting having a body 88 (Figs. 3 and 7) rounded at the upper end 90 and tapering at the opposite end 92. The body portion 88 is provided with a pair of holes for receiving suitable screws 94 for mounting the outside bracket 86 on the windshield post 18. The outside bracket is provided with a laterally extending boss 96. The body 88 is provided with a cylindrical aperture 98 receiving the mounting sleeve 28 and a counterbore 100 in the boss 96 communicates with the aperture 98. A sleeve 102 of steel or the like fits in the counterbore 100. Laterally extending arms 104 on the side of the boss 96 are provided with aligned apertures one of which is threaded for receipt of a screw 106. The boss 96 is slotted in alignment with the space between the arms 104 so that the boss 96 in cooperation with the arms 104 forms in effect a split clamp for clamping on the sleeve 102.

In order to mount the dirigible spot light 24 a suitable hole is drilled or bored through the windshield post 18 and the mounting sleeve 28 is passed through this hole and also through the inside mounting bracket 34 and the outside mounting bracket 86. The rubber spacer 80 fits against the inside of the windshield post 18 as best may be seen in Fig. 3 and is kept from rotation by its frictional grip on the sleeve 28 and also by it engagement against the windshield post. It will be apparent that if the angle of the oblique face 84 is not initially correct that this face readily can be trimmed to the proper angle with a commonly available tool such as a knife, razor blade, or scissors. The protuberances 78 on the wire clip 68 dig into the spacer 80 slightly as the clip is curled against the spacer by the bracket body 42. The set screw 52 is tightened against the foot 64 of the bracket arm 60 to clamp the same against the mounting sleeve 28 and thus to secure the entire inside bracket 34 tightly on the sleeve and against the windshield post 18. The bracket arm 60 readily is twisted to any desired configuration with a pair of pliers to position the eyelet 62 against an inside portion of the car body such as the flattening out portion 20 of the windshield post. A sheet metal screw 108 passed through the eyelet 62 and threaded into the car body fixes the inside bracket 34 relative to the car body. The digging of the protuberances 78 into the spacer 80 prevents rotation of the wire clip 68 and a wire 110 leading from the ignition switch or the like (not shown) to the spot light switch 32 readily can be clamped against the bracket body 42 in an out-of-the-way position by further bending of the portions 74 and 76 of the wire clip arm 72.

The outside bracket 86 readily is secured against the outside of the windshield post 18 by the screws 94 which may be sheet metal screws. The sleeve 102 is clamped tightly in the outside bracket by tightening the screw 106 and a sleeve 112 forming a portion of the lamp unit 26 also fits over the sleeve 102. The dirigible spot light 24 of course is dissassembled and assembled in the usual manner during installation in the automobile or the like.

It readily will be seen that the inside bracket herein disclosed is capable of installation in practically any automobile, truck or the like with only a bending of a part readily deformed by a pair of pliers and with the possible cutting of a relatively soft piece of rubber or the like. Only one fastener is utilized to fix the inside bracket to the car body and only two fasteners are used to secure the outside bracket to the car body so that a relatively very small number of holes need be formed in the body.

Although a particular example of my invention has been shown and described for illustrative purposes, modifications thereof doubtless will appear to those skilled in the art. It is to be understood that my invention includes not only the specific examples shown and described but also all such modifications and variations as may fall within the spirit and scope of the appended claims.

I claim:
1. A dirigible lamp mounting comprising, in combination with a supporting structure to which the lamp is to be attached, a bore through said structure, a mounting sleeve extending through said bore and outwardly therefrom at each of its ends, an annular bracket member in surrounding relation to said sleeve in close-fitting relation thereto, said member being relieved axially along certain of its portions confronting said sleeve to define a keyway, a key extending through said way and turning radially outward at each of its ends so as to define a hook embracing said member at one end and an arm projecting therefrom at the other, a flexible bushing confined between said member and the contiguous face of said supporting structure circumjacent to said sleeve, said bushing being conformed to said face by preshaping and distortion incident to being compressed between said face and member, and a wire-holding clip confined between said member and bushing in surrounding relation to said sleeve having a radial wire engaging protuberance and a plurality of axially offset struckout portions around its surface confronting said bushing and penetrating the latter.

2. The invention of claim 1, in which the arm of said key is made fast to said supporting structure.

3. The invention of claim 1, a radially projecting boss on said member having a screw-threaded bore extending radially therein and communicating with said keyway, and a set-screw in said threaded bore releasably binding said member, key and sleeve together.

References Cited in the file of this patent
UNITED STATES PATENTS

| Number | Name | Date |
|---|---|---|
| 1,604,870 | Asman | Oct. 26, 1926 |
| 1,702,772 | Gross | Feb. 19, 1929 |
| 1,772,918 | Sklarek | Aug. 12, 1930 |
| 1,906,489 | Sklarek | May 2, 1933 |
| 1,913,075 | Gross | June 6, 1933 |
| 2,014,454 | Russell | Sept. 17, 1935 |
| 2,444,189 | Finneburgh, Jr. et al. | June 29, 1948 |